Patented May 10, 1927.

1,628,066

UNITED STATES PATENT OFFICE.

JAMES R. ROSE, OF EDGEWORTH, PENNSYLVANIA, ASSIGNOR TO CARBO-HYDROGEN COMPANY OF AMERICA, OF PITTSBURGH, PENNSYLVANIA, A CORPORATION OF DELAWARE.

GAS FOR CUTTING AND WELDING PURPOSES.

No Drawing.   Application filed August 3, 1918. Serial No. 248,135.

This invention relates to gases employed with blowpipes or torches for the purpose of cutting and welding metals. It is the general object of this invention to produce a gas for this purpose which, while extremely economical of production, is nevertheless efficient in operation.

As is well known, hydrogen, while producing by its combustion a flame temperature sufficient for heating metal for cutting and welding purposes, has been found to be commercially impractical for such use because of the fact that its flame is colorless, making it extremely difficult to bring the flame into proper relation to the metal and adjust the proper economical quantity. As a result, a vast amount of hydrogen, particularly in plants equipped for the production of oxygen by electrolysis, is allowed to go to waste. By the use of my invention, this hydrogen, is rendered capable of efficient utilization and a large and aditional field for its employment is opened up to the public.

Furthermore, the gas which is used to a great extent for cutting and welding purposes is acetylene. While this gas produces by its combustion a flame temperature which is amply sufficient for cutting and welding purposes, it requires for its combustion a large proportion of oxygen, thus rendering its employment expensive. In and through the use of my invention, I am enabled to produce a gas for cutting and welding purposes, the flame temperature whereof is not materially lower than that produced by the combustion of hydrogen alone and one which will, by its combustion, produce an interior visible cone which will enable the flame conveniently to be brought into operative relation to the metal during the cutting and welding operations.

In the production of my gas, I add to hydrogen substantially 20 per cent by volume of methane, or natural gas. This mixture will remain in a homogeneous condition, will produce a flame temperature of not less than 4,000° F. and will stand a compression of at least 1800 pounds per square inch without deterioration, or impairment of heating values. The gas thus produced may therefore be stored under pressure within tanks and shipped to various consumers. Because of its stability, cheapness, and efficiency, it has proven particularly valuable in the fields hereinbefore indicated.

This gaseous mixture will produce a blowpipe flame of large volume and extremely rich in heat units, and such a flame is particularly useful in preheating rapidly large masses of metal, thereby enabling such masses to be cut, despite the loss of heat due to radiation. The blow-pipe flame produced by the combustion of this gaseous mixture is also particularly useful in cutting alloys, cast steel, and corroded, dirty and slaggy iron.

Having thus described my invention what I claim is:—

A gas for cutting and welding with oxygen, comprising essentially a mixture of hydrogen with substantially 20 per cent by volume of methane.

In testimony whereof, I hereunto affix my signature.

JAMES R. ROSE.